(12) United States Patent
Hanawa

(10) Patent No.: US 6,519,630 B1
(45) Date of Patent: Feb. 11, 2003

(54) PRODUCTION OF DOCUMENT DATA INCLUDING DYNAMIC CHARACTER REPRESENTATION

(75) Inventor: Takeshi Hanawa, Tokyo-to (JP)

(73) Assignees: Pioneer Electronic Corporation, Tokyo-To (JP); Increment P Corporation, Tokyo-To (JP)

( * ) Notice: Subject to any disclaimer, the term of this patent is extended or adjusted under 35 U.S.C. 154(b) by 0 days.

(21) Appl. No.: 09/309,172

(22) Filed: May 10, 1999

(30) Foreign Application Priority Data

May 11, 1998 (JP) .......................................... 10-127233

(51) Int. Cl.[7] .............................................. G06F 13/38
(52) U.S. Cl. ....................... 709/206; 709/217; 709/228; 713/200
(58) Field of Search ................................ 709/206, 220, 709/222, 246, 217, 226, 228, 205; 345/340; 713/200; 382/229, 7

(56) References Cited

U.S. PATENT DOCUMENTS

| | | | |
|---|---|---|---|
| 5,687,254 A | 11/1997 | Poon et al. ................. | 382/229 |
| 5,859,967 A | 1/1999 | Kaufeld et al. ............. | 713/200 |
| 5,884,032 A | 3/1999 | Bateman et al. ............ | 709/206 |
| 6,081,831 A | 1/2000 | Miura ........................ | 709/206 |
| 6,040,832 A | 3/2000 | Porech et al. ............... | 345/340 |
| 6,141,695 A | 10/2000 | Sekiguchi et al. .......... | 709/246 |

*Primary Examiner*—Ayaz Sheikh
*Assistant Examiner*—Khanh Quang Dinh
(74) *Attorney, Agent, or Firm*—Ladas & Parry

(57) ABSTRACT

A method of transmitting and receiving an electronic mail includes the steps of: transmitting the electronic mail from a sender terminal to a receiver terminal, and receiving the electronic mail at the receiver terminal. The transmitting step includes the steps of producing the electronic mail including character codes of characters constituting a mail document, at least one conversion program for converting the characters to be displayed in a dynamic manner and an address of the receiver terminal, and transmitting the electronic mail. The receiving step includes: receiving the electronic mail; from a font storage unit storing character patterns corresponding to character codes, reading out the character patterns corresponding to the character codes included in the electronic mail; spreading the read-out character patterns on a bit map memory to produce bit map fonts; converting the bit map fonts by using the received conversion program according to the passage of time; and displaying the converted bit map fonts on a display device.

17 Claims, 7 Drawing Sheets

FIG. 5

| | □□⊠ |
|---|---|
| Adrs: aaa.co.jp<br>CC:<br>Re: New member of our family | |

Dear ○○　　　　　　　　50

At last we got a child ! Luckily, Boy ! My wife seems to be disappointed a little bit because she expected a girl in her heart, but I'm Very Happy!
I'm quite stimulated when I think now I am a FATHER.　　51
　　　　　　　　　　　　　　　　　　　　　52

My wife will be back home in a few days, so please visit our home. It will be happy if your son gonna be a good brother for him.

Anyway, thank you for concerning about us and we hope to see you soon.

○○○○
　　　　　　　　　　　　　　　　　　E-mail: abcd.co.jp

FIG. 6A Very Happy!

FIG. 6B Very Happy!

FIG. 6C Very Happy!

PRODUCTION OF DOCUMENT DATA INCLUDING DYNAMIC CHARACTER REPRESENTATION

BACKGROUND OF THE INVENTION

1. Field of the Invention

This invention relates to a character display technique, and more particularly to a technique for displaying characters or letters produced by a word processor, for example, in a dynamic manner.

2. Description of the Prior Art

Conventionally, the transmission of written information is performed in the form of printed papers. Namely, people write sentences on papers by hand or by using a word processor, and the document thus made is printed on papers. Thus, information is transmitted in the form of the papers. Recently, as an alternative to the information transmission using papers, an electronic mail (hereinafter referred to "E-mail") has been broadly used. Generally, in the information transmission using the E-mail, the sender makes an E-mail including some sentences or comments by using a terminal device, and sends the E-mail thus made via a communication path or a network. The receiver receives, opens and reads the E-mail addressed to him or her by operating the terminal device. Therefore, the information transmission via E-mail mostly utilizes the display screen of the terminal device for displaying the information. Thus, the manner of information transmission is now changing from the conventional way using papers to the recent paperless way using E-mail.

However, E-mail is sometimes unsatisfactory in its poor expressiveness of the contents written. Normally, the written information in the E-mail is produced and transmitted in the form of text data. Since it is difficult to freely modify and/or emphasize the characters in the text data, the E-mail cannot play a role of more than a plain and dry information transmission means. Some E-mail users use illustration so-called "face mark" (simple figure made by the combination of marks or symbols included in the text data. It is called "face mark" because the figure expressing human face is frequently made.) to make the contents of E-mail more expressive and attractive. However, there still is a limit in enhancing the expressiveness the E-mail contents by this technique.

On the other hand, the expressiveness of E-mail may be enhanced by attaching image data such as still picture or moving picture to the E-mail. However, it sometimes takes relatively long time to make an E-mail. Also, attaching the image data to the E-mail greatly increases the total file size (data-amount) of the E-mail, and hence its transmission via the transmission path unnecessarily takes long time. Therefore, attaching image data is not a good way in practical view.

SUMMARY OF THE INVENTION

One reason that E-mail lacks expressiveness originates from the fact that the character itself is visually static, i.e., it does not change its appearance. As mentioned above, the characters are originally used in the form printed on a paper, and hence the character itself originally does not involve the concept of movement or appearance change. However, at present, the information transmission using E-mail has been broadly used, and the information transmitted via E-mail is mainly shown, not on a paper, but on a screen of display device. Therefore, it is possible to enhance the expressiveness of the E-mail contents by dynamically showing the characters. In this view, it is an object of the present invention to provide a character display technique capable of transmitting and displaying expressive documents in a simple way without excessive increase of data amount.

According to one aspect of the present invention, there is provided a method of transmitting and receiving an electronic mail including the steps of: transmitting the electronic mail from a sender terminal to a receiver terminal, the transmitting step including the steps of producing the electronic mail including character codes of characters constituting a mail document, at least one conversion program for converting the characters to be displayed in a dynamic manner, and an address of the receiver terminal, and transmitting the electronic mail; and receiving the electronic mail at the receiver terminal, the receiving step including: receiving the electronic mail; from a font storage unit storing character patterns corresponding to character codes, reading out the character patterns corresponding to the character codes included in the electronic mail; spreading the read-out character patterns on a bit map memory to produce bit map fonts; converting the bit map fonts by using the received conversion program according to the passage of time; and displaying the converted bit map fonts on a display device.

In accordance with the method of transmitting and receiving an electronic mail, at the transmitting side of the electronic mail, characters for making a mail document are inputted to produce corresponding character codes. In addition, the conversion program for displaying the characters in the dynamic manner and the address of the receiver of the mail are designated, and the electronic mail including these are produced and transmitted. On the other hand, at the receiving side of the mail, based on the character codes included in the transmitted electronic mail, corresponding character patterns are obtained, and the character patterns are spread on the bit map memory to produce bit map fonts. Then, the bit map fonts are converted by using the conversion program in the electronic mail according to the passage of time. Thereafter, the bit map fonts after the conversion are displayed on the display device. By this, the characters included in the electronic mail are displayed in the dynamic manner.

In a preferred embodiment, the conversion program may include a coordinate conversion program for converting coordinates of pixels constituting the bit map font according to the passage of time. Thus, the dynamic representation of the characters may be achieved by the simple coordinate conversion processing.

In another preferred embodiment, the conversion program may include a filter program for performing filter operation processing of the bit map font. Thus, the dynamic representation of the characters may be achieved by executing the filter operation program at the receiving side.

According to another aspect of the present invention, there is provided an electronic mail transmitting, method including the steps of: inputting character sequence constituting a mail document via an input device to produce character codes corresponding to the character sequence; designating a range of the character sequence and a type of dynamic character display applied to the range via the input device to produce data indicating the designated range and data indicating the type of the dynamic character display; designating an address of a receiver of the electronic mail via the input device; producing an electronic mail including the character codes, the data indicating the designated range, the data indicating the type of the dynamic character display and the address of the receiver; and transmitting the electronic mail to the address of the receiver.

In accordance with the electronic mail transmitting method, the mail writer inputs the character sequence constituting the mail document via the input device to produce the character codes corresponding to the character sequence. In addition, the mail writer designates the range of the character sequence and the type of dynamic character display applied to the range via the input device to produce data indicating the designated range and data indicating the type of the dynamic character display. Further, the mail writer designates the address of a receiver of the electronic mail via the input device. At the time of transmitting the electronic mail, the electronic mail including the character codes, the data indicating the designated range, the data indicating the type of the dynamic character display and the address of the receiver is produced and transmitted to the,address of the receiver. Therefore, an electronic mail which enables dynamic representation of character may be produced and transmitted.

According to still another aspect of the present invention, there is provided a method of receiving an electronic mail including character codes of characters constituting an electronic mail and at least one conversion program for converting the characters to be displayed in a dynamic manner, the method including the steps of: receiving the electronic mail; from a font storage unit storing character patterns corresponding to character codes, reading out the character patterns corresponding to the character codes included in the electronic mail received; spreading the read-out character patterns on a bit map memory to produce bit map fonts; converting the bit map fonts by using the received conversion program according to the passage of time; and displaying the converted bit map fonts on a display device.

In accordance with the electronic mail transmitting method, the character patterns corresponding to the character codes included in the electronic mail is read out from the font storage unit, and then the read-out character patterns are spread on a bit map memory to produce bit map fonts. Then, the bit map fonts are converted by using the received conversion program according to the passage of time, and the converted bit map fonts are displayed on the display device. Therefore, an electronic mail which enables dynamic representation of character may be produced and transmitted.

According still another aspect of the present invention, there is provided a computer-readable storage medium for storing a computer program to control a computer to execute the steps of: receiving inputs of character sequence constituting a mail document via an input device to produce character codes corresponding to the character sequence; receiving designation of a range of the character sequence and a type of dynamic character display applied to the range via the input device to produce data indicating the designated range and data indicating the type of the dynamic character display; receiving designation of an address of a receiver of the electronic mail via the input device; producing an electronic mail including the character codes, the data indicating the designated range, the data indicating the type of the dynamic character display and the address of the receiver; and transmitting the electronic mail to the address of the receiver via a communication means. By this, an electronic mail which enables dynamic representation of character may be produced and transmitted.

According to still another aspect of the present invention, there is provided a character display device including: a unit for obtaining a document data including character codes corresponding to the characters constituting a document and at least one conversion program for displaying the characters in a dynamic manner; a bit map memory; a unit for reading out the character patterns corresponding to the character codes included in the document data obtained and for spreading the character patterns on the bit map memory to produce bit map fonts; a converter for converting the bit map fonts by the conversion program according to the passage of time; and a display for displaying the bit map font converted by the converter.

In accordance with the device thus configured, a document data including character codes corresponding to the characters constituting a document and at least one conversion program for displaying the characters in a dynamic manner is obtained. Then, the character patterns corresponding to the character codes included in the document data are obtained, and the character patterns are spread on the bit map memory to produce bit map fonts. Then, the bit map fonts are converted by the conversion program according to the passage of time, and the bit map font converted by the converter is displayed. By this, a document which enables dynamic representation of character may be produced and transmitted.

According to still another aspect of the present invention, there is provided a computer-readable storage medium for storing a computer program to control a computer to execute the steps of: obtaining a document data including character codes corresponding to the characters constituting a document and at least one conversion program for displaying the characters in a dynamic manner; reading out character patterns corresponding to the character codes included in the obtained document data from a font storage unit for storing character patterns corresponding to character codes and for spreading the character patterns on a bit map memory to produce bit map fonts; converting the bit map fonts by the conversion program according to the passage of time; and displaying the bit map font converted by the converting step. By this, a document which enables dynamic representation of character may be produced and transmitted.

According to still another aspect of the present invention, there is provided a document data producing device including: a unit for receiving character sequence constituting a document via an input device and for producing character codes corresponding to the character sequence; a unit for receiving designation of a range of the character sequence and a type of dynamic character display applied to the range via the input device to produce data indicating the designated range and data indicating the type of the dynamic character display; and a unit for producing document data including the character codes, the data indicating the designated range and a conversion program corresponding to the data indicating the type of the dynamic character display.

In accordance with the device thus configured, character sequence constituting a document is inputted via an input device, and character codes corresponding to the character sequence are produced. Then, a range of the character sequence and a type of dynamic character display applied to the range are designated via the input device to produce data indicating the designated range and data indicating the type of the dynamic character display. Finally, a document data including the character codes, the data indicating the designated range and a conversion program corresponding to the data indicating the type of the dynamic character display is produced. Thus, a document data including dynamic character representation may be produced.

Preferably, the device may further include a unit for storing the document data in a storage medium. By this, the document data may be distributed in the form of the storage medium.

According to still another aspect of the present invention, there is provided a document data supplying device including: a unit for receiving character sequence constituting a document via an input device and for producing character codes corresponding to the character sequence; a unit for receiving designation of a range of the character sequence and a type of dynamic character display applied to the range via the input device to produce data indicating the designated range and data indicating the type of the dynamic character display; a unit for producing document data including the character codes, the data indicating the designated range, the data indicating the type of the dynamic character display; a unit for producing a HTML (Hyper Text Markup Language) text including the document data produced by the document producing unit; and a unit for transmitting the HTML text to a receiver terminal via the internet.

In accordance with the device thus configured, the HTML text including the document data is produced by the document producing unit, and the HTML text is transmitted to a receiver terminal via the internet. Therefore, the homepage including the dynamic character representation may be provided via the internet.

According to still another aspect of the present invention, there is provided a computer-readable storage medium for storing a computer program to control a computer to execute the steps of: receiving inputs of character sequence constituting a document via an input device and producing character codes corresponding to the character sequence; receiving designation of a range of the character sequence and a type of dynamic character display applied to the range via the input device to produce data indicating the designated range and data indicating the type of the dynamic character display; and producing document data including the character codes, the data indicating the designated range and a conversion programs corresponding to the data indicating the type of the dynamic character display. Thus, a document data including dynamic character representation may be produced.

Preferably, the program may control the computer to further execute the steps of: reading out character patterns corresponding to the character codes of the characters included in the designated range from a font storage unit storing character patterns corresponding to character codes, and spreading the character patterns on a bit map memory to produce bit map fonts; converting the bit map fonts by a conversion program according to the passage of time; and displaying the bit map fonts converted. Thereby, the document including the dynamic character representation may be displayed during or after writing it.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 5 shows an example of a window with which an E-mail including dynamic font is made.

FIGS. 6A–6C and 7A–7B show examples of dynamic fonts of various types.

DETAILED DESCRIPTION OF THE PREFERRED EMBODIMENTS

The preferred embodiments of the present invention will now be described below with reference to the attached drawings.

[1] 1st Embodiment

The first embodiment of the present invention will be described. In the first embodiment, the dynamic character displaying technique is applied to the transmission and reception of E-mail.

(1) E-mail Transmission and Reception System

Figure 1:
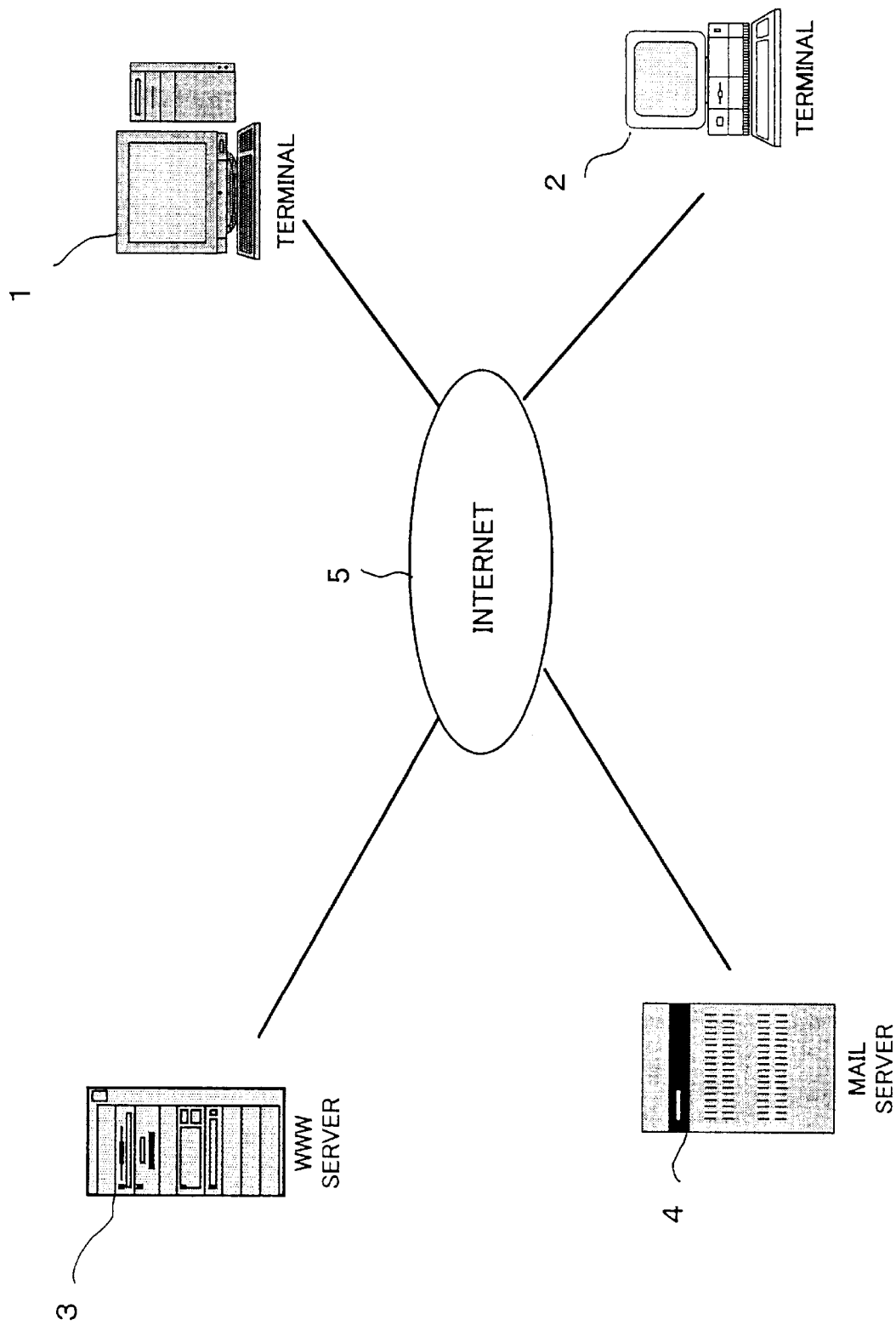
FIG. 1 shows a schematic configuration of an example of E-mail transmission and reception system according to the present invention, which utilizes the internet.

First, the E-mail transmission and reception system will be briefly described. FIG. 1 shows a schematic configuration of an example of E-mail transmission and reception system which utilizes the internet. In FIG. 1, a terminal 1, a terminal 2, a WWW (World Wide Web) server 3 and a mail server 4 are connected to the internet 5.

Now, it is assumed that a user A using the terminal 1 sends an E-mail to a user B using the terminal 2. The user A starts an E-mail software or an editor on the terminal 1 to write a mail document. According to the present invention, the terminal 1 produces an E-mail including characters whose appearance (shape, color, etc.) dynamically changes (hereinafter referred to as "dynamic font") according to the character display technique of the present invention. The method of producing the E-mail including dynamic fonts will be described later. Then, the terminal 1 sends the mail document thus produced to the mail address of the user B, the receiver of the E-mail. The E-mail is transmitted to the mail server 4 via the internet 5 and saved in the mail box corresponding to the designated mail address of the user B. The user B starts the E-mail software on the terminal 2, makes an access to the his or her own mail box in the mail server 4, and downloads the E-mail in the mail box to the terminal 2. Then, the user B opens and reads the contents of the E-mail. It is noted that the WWW server 3 does not operate in the first embodiment, but operates in the second embodiment described later. Hence, the WWW server 3 will be described in the second embodiment.

Figure 2:
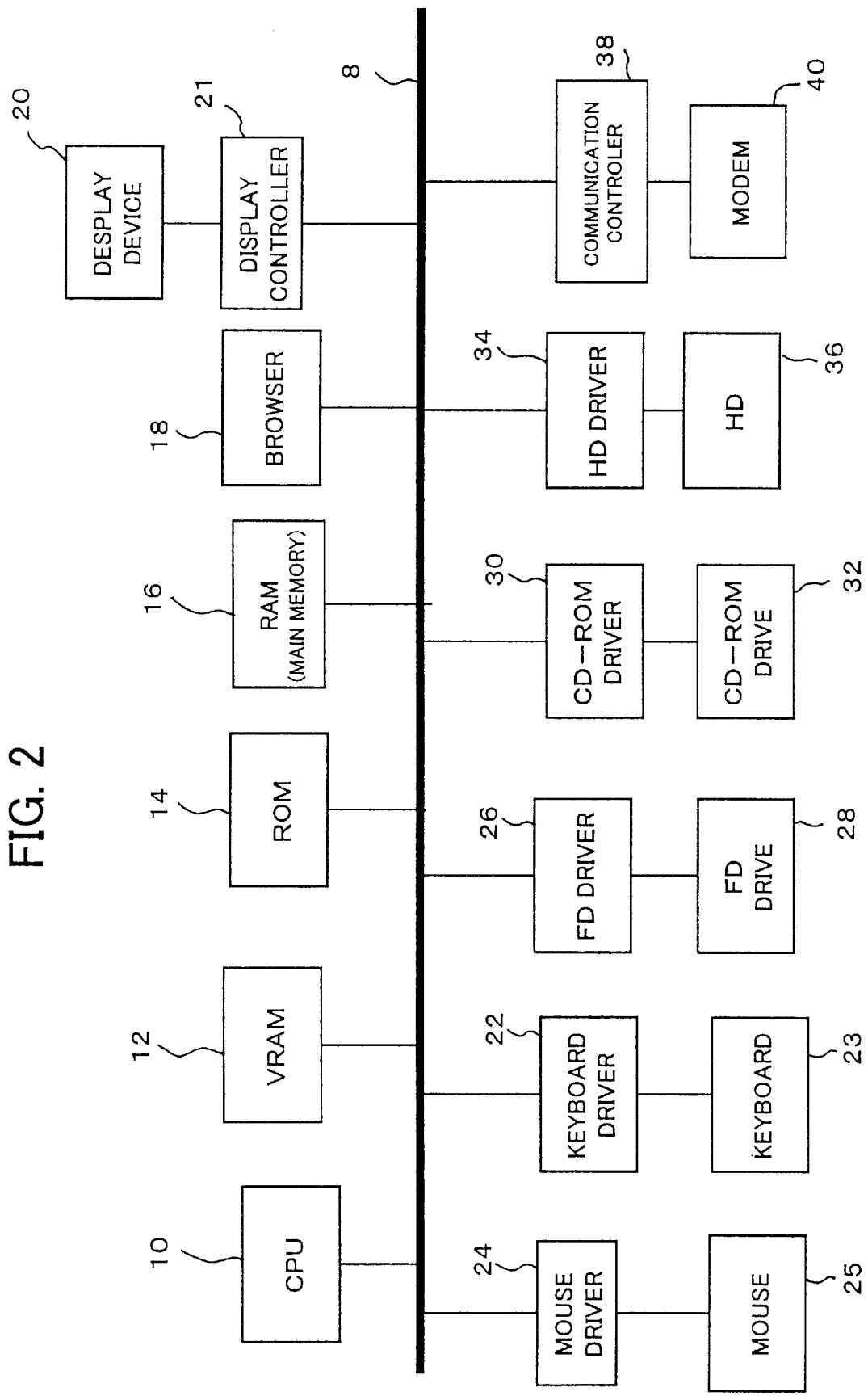
FIG. 2 is a block diagram showing a schematic configuration of a terminal used to make E-mail according to the character display technique of the present invention.
Figure 3:
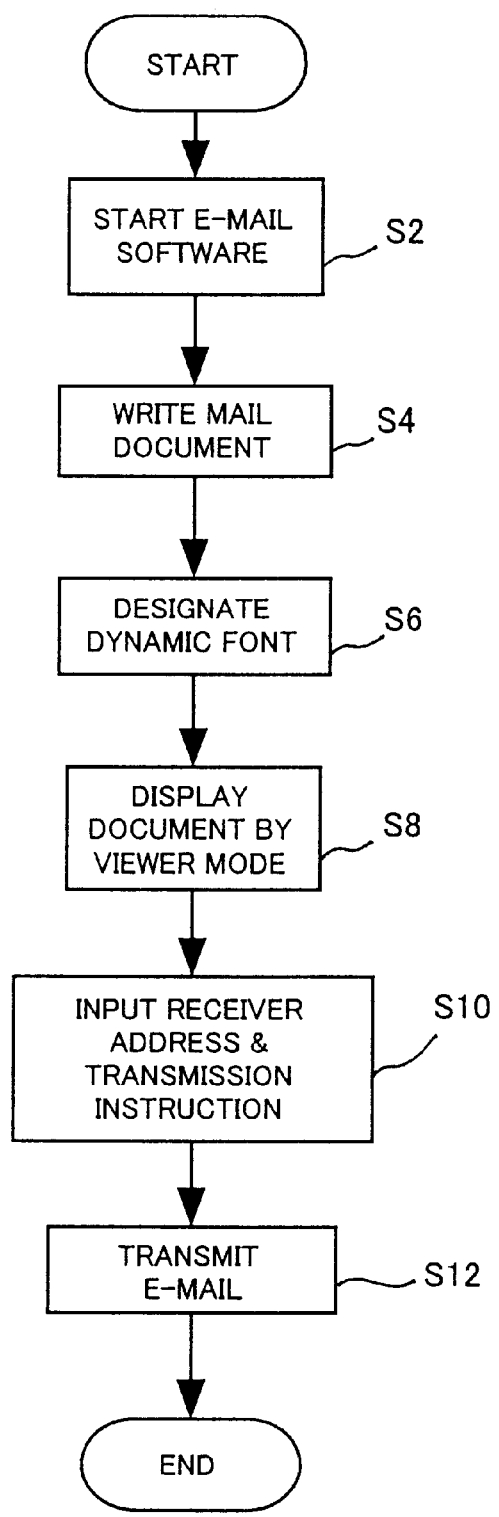
FIG. 3 is a flowchart showing the processing for making E-mail including dynamic font.

Next, the configuration of the terminal used for making and displaying E-mail including dynamic fonts will be described with reference to FIG. 2. FIG. 2 is a block diagram showing a schematic configuration of the terminal used for making E-mail according to the character display technique of the present invention. In FIG. 2, the components of the terminal are connected to each other via a bus 8. The bus 8 is configured as a multiple input/output lines each having address bus, data bus, etc.

A ROM (Read Only Memory) 14 is a non-volatile memory for read-out purpose only, and stores various programs executed when a CPU 10 controls each component. The ROM 14 also stores conversion programs corresponding to respective types of dynamic font described later. A RAM (Random Access Memory) 16 is a readable and rewritable type non-volatile memory, and temporarily stores programs executed in the various control in the terminal as well as necessary data. In this first embodiment, in the RAM 16, a document data area for storing the document data of the received E-mail is produced. In addition, when the character data is converted to display the dynamic font, a bit map memory area used for the conversion processing is produced at a part of the RAM 16. A display device 20 may be a CRT (Cathode Ray Tube) or a LCD (Liquid Crystal Display), and is controlled by a display controller 21 to display image data including characters.

A VRAM (Video RAM) 12 is used as a data area for spreading character and image data to be shown on the display device 20, and stores pixel data for one display screen in the form of bit map data. Specifically, the VRAM 12 has addresses corresponding to all pixels of the display screen of the display device 20, and stores corresponding pixel data. Data spread on the VRAM 12 is periodically read out under the control by the display controller 21 and shown on the screen of the display device 12. A keyboard 23 serves as an input device of character data and various instructions, and is connected to the bus 8 via a keyboard driver 22. When making an E-mail, a user inputs desired characters via the keyboard 23 to write a mail document. A mouse 25 serves as an input device of various instructions and designations, and is connected to the bus 8 via a mouse driver 24. The mouse 25 is also used for designating the dynamic font described later during writing the mail document.

A floppy disk (FD) drive 28 and a CD-ROM drive 32 are used as input/output means of document data, and are controlled by a floppy disk driver 26 and a CD-ROM driver 30, respectively. A hard disk (HD) 36 serves as a storage device of various data and programs. Particularly, in this embodiment, the hard disk 36 stores font data files. The font data files store respective font data (image data) constituting characters in correspondence with character codes, and are read out onto the RAM 16 in use. Alternatively, the font data files may be prepared as a separate ROM. A modem 40 connects to external net works such as the internet under the control of a communication controller 38 to enable data exchange. A browser 18 is used by the user to view home-pages of WWW servers on the internet.

(2) Dynamic Font

Next, dynamic font will be described in detail. In the present invention, on the premise that characters of mail document is not printed on a paper but shown on a screen of a display device, the characters shown on the display device are controlled to visually dynamically change their appearances according to the passage of time. Such a character will be hereinafter called as "dynamic font". Specifically, the features of the dynamic change of character's appearance according to the dynamic font include the change of the character in its color, its orientation (i.e., rotation of character), its shape (e.g., shaking of character), its outline, and the addition of an decoration such as a mark, figures, etc., to the surrounding and/or background of the character. In the following description, the type of change described above will be mentioned as a "type of dynamic font".

Displaying the dynamic font is executed by the CPU of the terminal device according to the conversion programs prepared separately for each type of dynamic font. The conversion programs for plural types of dynamic font are stored in the ROM 14 of the terminal in advance. The conversion program executes the conversion processing in the following manner. First, the font data of the character designated as the dynamic font by the writer of the mail document is spread on the bit map memory area formed within the RAM 16. Then, the conversion is applied to the font data on the bit map memory area. The contents of the conversion processing depend upon the type of the dynamic font. Then, the bit map data after the conversion is written into the VRAM 12. This job is repeated at every predetermined time period. The data written into the VRAM 12 is represented on the screen of the display device 20 at every predetermined time period under the control of the display controller 21, and hence the characters shown on the display device 20 dynamically change their appearances by periodically overwriting the converted data into the VRAM 12.

Next, the conversion processing for each type of dynamic font will be described.

First, in the dynamic font which changes the color of the character (hereinafter referred to as "color change type dynamic font"), the color code is designated for each pixel of the bit map data spread on the bit map memory area, and is then written into the VRAM 12. By changing the designation of color codes at every predetermined time period, the color of the character changes as the time passes. For example, by designating the color codes such that the character colors of red, blue and yellow are repeatedly designated, the dynamic font shown on the display device changes among those three colors repeatedly. Therefore, the conversion program for the dynamic font of this type allows the writer of the mail document to arbitrarily designate the color to be changed and the color changing period.

In the dynamic font in which the character rotates (hereinafter referred to as "rotation type dynamic font"), the coordinate conversion is applied to each pixel of the bit map data spread on the bit map memory area of the RAM 16. The rotation angle of the character may be a given fixed value, or may be selected by the writer from plural options. The conversion program calculates the coordinate of each pixel after rotation based on the rotation angle, and writes the bit map data including the pixels after the rotation into the VRAM 12. By setting the plural steps of rotation angles and appropriately changing the time interval of the rotation processing, it is possible to make the characters always rotate, thus giving the viewer such an impression that characters are dancing or swinging. FIGS. 6A to 6C show examples of the movement of the dynamic font rotating about 30 degrees in both clockwise and counterclockwise directions. FIG. 6A shows the normal state of character, and FIGS. 6B and 6C show the character rotated for about 30 degrees in the counterclockwise and clockwise directions, respectively. By repeatedly displaying the characters of rotated states as seen in FIGS. 6B and 6C, the characters always rotate rightward and leftward, thereby expressing the characters swinging or dancing.

Figure 7A:
Figure 7B:
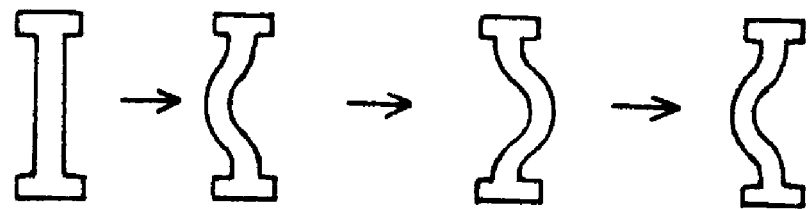

In the dynamic font in which the characters shakes (hereinafter referred to as "shaking type dynamic font"), each pixel of the bit map data spread on the bit map memory area is shifted in the left/right direction and/or up/down direction. If all pixel data are shifted for the same amount, the character shakes as a whole. Repeatedly shifting the pixel data in the up/down direction may create the expression like the character jumping. If the pixels of only a part of the character (e.g., the center portion) are shifted repeatedly leftward and rightward, the character may be shown such that only the center portion of the character is swaying, as shown in FIG. 7B.

In the dynamic font in which the outline of the character is changed (hereinafter referred to as "outline change type dynamic font"), the outline of the character can be made thicker by adding pixel data neighboring the pixels of the character's outline to the bit map data on the bit map memory area. By periodically applying and releasing this addition of data, the outline of the character periodically become thick, thereby visually emphasizing the character as a whole.

In the dynamic font in which an decoration is applied around the character (hereinafter referred to as "decoration type dynamic font"), a certain mark, figure and/or small illustration may be added to the pixel data spread on the bit map memory area. For example, adding the image of a flame behind the character may make the character look like flaming or burning as shown in FIG. 7A. This may be done by adding the pixel data constituting the image of flame, with designating the color of the pixel data of the flame around the pixel data of the character. Namely, it is unnecessary that the portion of the decoration to be added to the character is prepared by the sender of the E-mail as image data. Namely, the data of decoration part be created and displayed as the bit map data by the receiver side of the E-mail according to the conversion program on the real time basis.

FIG. 5 shows an example of E-mail using dynamic fonts. In FIG. 5, the character of "Boy", indicated by the reference numeral 50, is the color change type dynamic font, and hence the color of the word "Boy" on the display device of the mail receiver changes periodically among some colors as the time passes. The words "Very Happy!", indicated by the reference numeral 51, is the rotation type dynamic font, and hence the words "Very Happy!" repeatedly rotate leftward and rightward in the manner described above by referring to FIGS. 6A to 6C. The word "FATHER" indicated by the reference numeral 52 is the decoration type dynamic font, and the image of flames is shown behind the word "Father" as shown in FIG. 7A. Thus, by using the dynamic font of various types at the portions in the mail document which need to be emphasized or which have a special meaning and/or intention, the expressiveness of the mail document may be greatly enhanced.

In order to achieve such dynamic font, the font data is converted using the conversion program described later. In the dynamic font of various types described above, the processing needed to realize the color changing type dynamic font, the shaking type dynamic font, the outline changing type dynamic font and the decoration type dynamic font is called as filter processing, and the conversion program which executes the filter processing is called as a filter processing program. It is noted that two or more types of dynamic fonts may be combined and applied to the same characters.

(3) Processing for Making and Displaying E-mail

Next, the processing to make and display E-mail including dynamic font will be described. First, the method of making E-mail including the dynamic font will be described. It is now assumed that the user A of the terminal 1 in FIG. 1 makes an E-mail and transmits it to the user B of the terminal 2. First, the user A runs the E-mail software having a function of processing dynamic fonts according to the present invention (step S2). The E-mail software is designed to have two operation modes: an editor (document writing) mode and a viewer (document display) mode. The editor mode is a mode in which the user makes a mail document including dynamic font, and the viewer mode is a mode in which the mail document including the dynamic font is shown on the screen of the display device. Therefore, the user A selects the editor mode at this stage.

Then, the user makes a mail document by operating the keyboard 23 (step S4). Specifically, when the user A inputs or designates characters (including numbers and marks), the CPU 10 obtains the font data corresponding to the character codes of the designated characters from the font data file, and writes them into the VRAM 12. Thus, the fonts corresponding to the designated characters are shown on the screen of the display device 20. If the input of the characters of the mail document is completed, the user carries out the designation of the dynamic font (step S6). Specifically, the user A designates the range to be displayed as the dynamic font and the type of the dynamic font applied to the designated range. This designation can be performed like the manner of making the character modification such as underline in a general word processor software. Namely, the user should designate a desired portion of the document using the keyboard 23 and/or mouse 25, and then designates the type of the dynamic font to be applied to the portion thus designated.

There are various types of dynamic font as described above, and the user makes necessary selection and/or designation in addition to the designation of the type of the dynamic font. For example, if the user designates the color changing type dynamic font, the user needs to designate the colors to be used and the color changing period, etc. If the user designates the rotation type dynamic font, the user needs to designate the rotation angle, time period of rotation, etc. When the designation of the dynamic font for desired portions of the document is completed in this way, the user A selects the viewer mode to confirm the contents of the mail document thus made (step S8). In the viewer mode, the mail document shown in FIG. 5, for example, is displayed on the display device 20 with the dynamic fonts shown in the dynamic representation. Namely, in the viewer mode, the color changing type dynamic font is shown with its color being periodically changed, and the rotation type dynamic font is shown as being rotated repeatedly. Since the editor mode does not show the dynamic fonts in the dynamic representation, the user making the mail document cannot know the actual way that the document is shown to the receiver, although he or she can know the portions designated as the dynamic font. Therefore, the user selects the viewer mode to confirm the dynamic representation of the mail document which will be shown to the receiver of the mail. This is similar to the confirming operation in using a general word processor, in which the writer may sometimes view the print image to confirm the modified portion (e.g., underlined portion, bolded portion, etc.) of the document.

In the viewer mode, the CPU 10 reads out the conversion program corresponding to the designated range and the type of the dynamic font from the ROM 14, and runs the program. Then, the CPU 10 performs the conversion processing using the bit map memory area in the RAM 16 described above, and writes the data after the conversion into the VRAM 12. Thus, the data in the VRAM 12 is a bit map data partially including the dynamic fonts among the normal font data. The display controller 21 displays the data in the VRAM 12 on the display device 20. The dynamic font is displayed in this way. It is noted that plural types of dynamic font may be used at plural portions in a single mail document. In that case, plural conversion programs corresponding to the designated types of the dynamic font run.

When the contents of the mail document is thus confirmed, the user A inputs necessary information such as the mail address of the receiver (i.e., user B), and instructs the transmission of the mail document (step S10). When receiving the instruction to transmit the mail document, the CPU 10 produces an E-mail including (a) font data of the mail document (specifically, the text file including character codes or the character data file for application program such as a word processor), (b.) dynamic font designation data (namely, data indicating the range where the dynamic font designation is made, the type of the dynamic font designated for the range and the supplementary data such as the color of the character, rotation angle, etc.), (c) the conversion program or programs (if plural types are designated) corresponding to the type of the dynamic font, and (d) the mail address of the receiver, and transmits the E-mail thus produced to the designated mail address of the receiver in the mail server 4 (step S12). The E-mail can be produced in the same way as a normal E-mail without dynamic font, however, it is different from the normal E-mail in that the E-mail of the present invention additionally includes data relating to the dynamic font (i.e., the above mentioned items (b) and (c)). It is important that the conversion program corresponding to the type of the dynamic font designated is attached to the E-mail and transmitted to the receiver. By this, the dynamic font can be displayed on the receiver's display device even if the receiver's terminal does not have E-mail software or viewer with dynamic font display function. The conversion program of the dynamic font is a simple program which changes the position and/or color designation of the bit map data forming the character, and the data obtained after the conversion is merely the bit map data. Therefore, the receiver of the E-mail of the present invention can display the dynamic font by a normal software which can display text data, with the aid of the conversion program sent together with the E-mail, even if he or she does not have the special software for displaying dynamic font. Since the conversion program performs simple processing such as the coordinate conversion and/or color designation change as mentioned above, the data size of the program itself is not so large. Therefore, attaching such program to the E-mail does not greatly increase the total data size of the E-mail to be transmitted.

In the above description, the designation of the dynamic font is performed after the typing of the mail document is completed. However, the designation of the dynamic font may be performed timely in parallel with the typing of the mail document. This is similar to the case where character modification such as the underline is made in a normal word processor. In the above description, after the designation of the dynamic font the user selects the viewer mode to show display the dynamic font and confirm the designation of the dynamic font. Alternatively, the E-mail software may be designed to have a single mode in which the character is displayed in the dynamic representation immediately after it is designated as the dynamic font.

Figure 4:
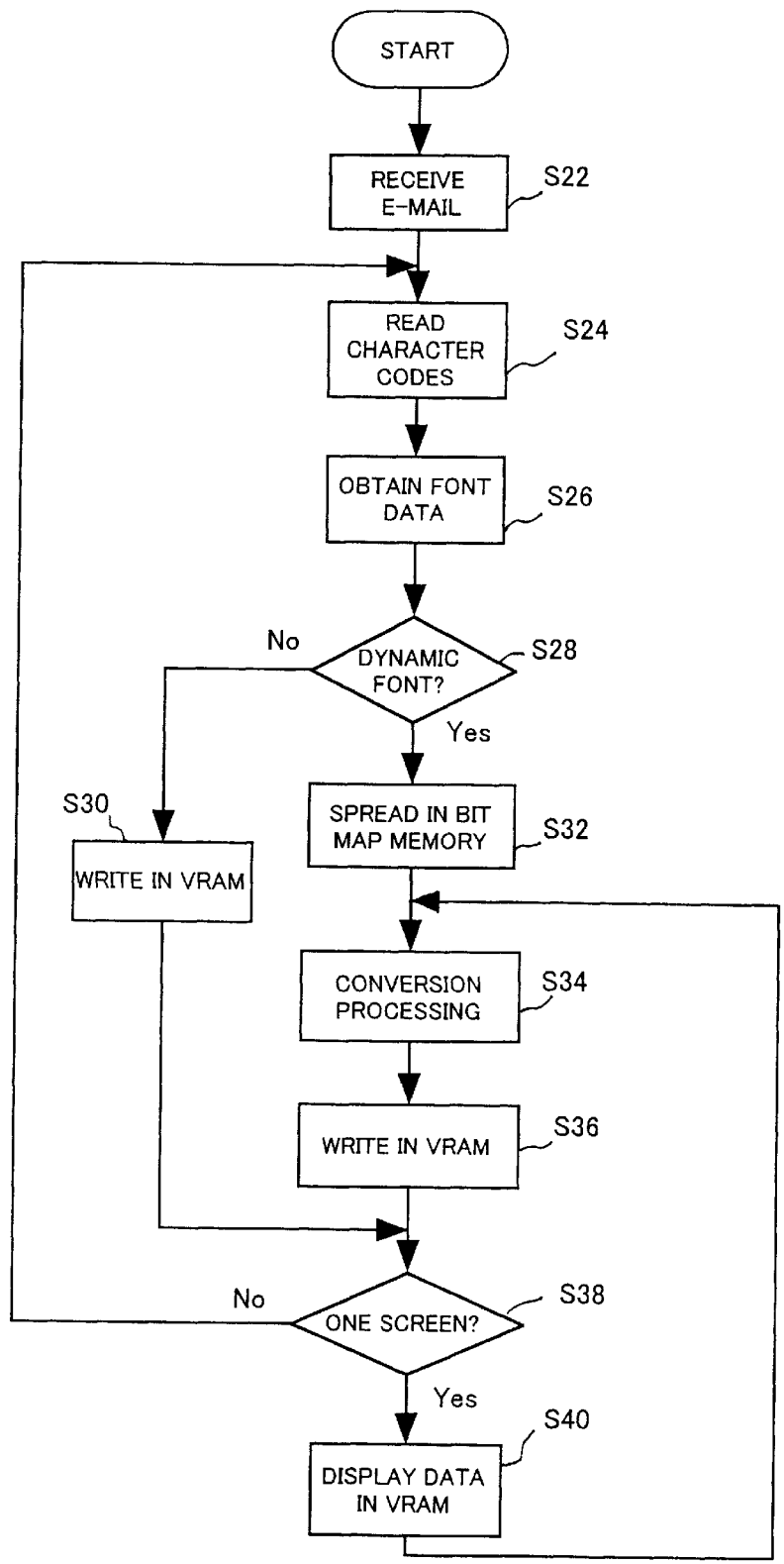
FIG. 4 is a flowchart showing the processing for opening and viewing an E-mail including dynamic font.

Next, the processing in which the receiver of the E-mail including the dynamic font opens and displays the E-mail will be described with reference to FIG. 4. It is assumed that the terminal 2 which receives the E-mail from the user A also has the configuration shown in FIG. 2. First, the user B of the terminal 2 runs an appropriate software (e.g., an E-mail software, a word processor, a text editor, etc.). Then, the user B accesses his or her mail box to download the E-mail sent to him or her, and opens it (step S22). As described above, the E-mail includes the font data of the mail document, dynamic font designation data and the conversion program for the designated dynamic font, and the CPU 10 temporarily stores them in the RAM 16. Subsequently, the CPU 10 detects that the mail document in the E-mail includes character code sequence, and reads out the sequence (step S24). Then, the CPU 10 obtains the font data corresponding to the read out character codes from the font data file (step S26). Then, the CPU 10 refers to the dynamic font designation data to determine whether or not the character is subjected to the dynamic font designation (step S28). If the character is not designated as the dynamic font (step S28;No), the CPU 10 writes the font data into the VRAM 12 (step S30). On the contrary, if the character is designated as the dynamic font (step S28;Yes), the CPU 10 spreads the font data on the bit map memory area in the RAM 16 (step S32). Then, the CPU 10 runs the conversion program corresponding to the type of the dynamic font designated for the character out of the conversion programs of the dynamic font transmitted with the E-mail, and converts the font data of the character (step S34). As mentioned above, this conversion includes the designation of color of the character, the coordinate conversion of pixels forming the character, etc. When the conversion is completed, the CPU 10 writes the bit map data after the conversion into the VRAM 12 (step S36). Thus, the conversion and display of one character ends.

Then, the CPU 10 judges whether or not there is other character code to be displayed in a single screen of the display device 20 (step S38). If there is other character code, the process returns to step S24 to perform the processing for the next character. On the contrary, if the processing is completed for all characters for one display screen (step S38; Yes), the display controller 21 sends the data in the VRAM 12 to the display device 20 to display them on the display screen (step S40). Thereafter, the process returns to step S34 to repeat the conversion processing for the characters designated as the dynamic font. Since the dynamic font changes its color, shape, etc., as the time passes, the characters can be dynamically displayed by repeating the conversion processing continuously. Thus, the mail document for one display screen is shown on the screen of the display device 20. In the mail document, the portions designated as the dynamic font are shown in the dynamic manner according to the type of the dynamic font designated. It is noted that the process shown in FIG. 4 ends when the user B ends the E-mail software. The mail document thus displayed on the display device 20 is the same as the example of the viewer mode display shown in FIG. 5. Since the conversion program for the dynamic font is transmitted with the E-mail and the conversion program performs the conversion processing on the bit map data area, the receiver of the E-mail having the function of at least displaying text data can display the dynamic font, even if the receiver's terminal device does not have a special software for handling dynamic font.

In this way, since the pixels of the bit map data are converted by the conversion program, the document including dynamic font may be used in the normal word processor. In that case, for the portions of the dynamic font, the bit map data after the conversion processing by the conversion program may be supplied to the word processor software.

[2] 2nd Embodiment

Next, the second embodiment of the present invention will be described. In the second embodiment, the document data including the dynamic font is applied to the WWW server of the internet. Namely, the dynamic font is used in displaying the homepage of the WWW server.

The processing executed when a user makes a connection with the WWW server will be described with reference to FIG. 1. It is now assumed that the user A of the terminal 1 views the homepage of the WWW server 3. First of all, the user A runs the browser 18 (see. FIG. 2) in the terminal 1 and inputs the address to access the WWW server 3 via the internet 5. The WWW server 3 produces the HTML (Hyper Text Markup Language) text which is directed to the terminal 1. At this time, the designation of dynamic font is included in the characters in the HTML text. In addition, the conversion programs corresponding to the types of the dynamic font designated are attached to the HTML text. The conversion program may be sent as a JAVA applet, for example. Thus, the dynamic font can be displayed even if the terminal 1 does not have the conversion program in advance. The WWW server 3 transmits the HTML text thus produced to the terminal 1 via the internet 5.

The browser 18 in the terminal 1 receives the HTML text and displays it on the display device 20. At that time, the characters designated as the dynamic font are displayed as the dynamic font in the same manner as described in the first embodiment with referring to FIG. 4. In this way, the characters in the homepage may be displayed in the dynamic manner.

Recently, many homepages of WWW servers introduce various moving pictures to show moving images. However, they achieve such a moving display by reproducing the moving picture data. Therefore, in those cases, it is necessary to download the moving picture data via the internet, and hence it takes relatively long time period until the homepage is completely shown. On the contrary, by using the dynamic font according to the present invention, only the text data and necessary conversion program should be downloaded from the WWW server and hence the amount of data necessary to be downloaded is relatively small, (though dynamic display is available only for the characters). Therefore, the method using the dynamic font requires remarkably short time period to complete the display, in comparison with the case in which the same character portion is downloaded and displayed as a moving picture.

[3] 3rd Embodiment

The third embodiment relates to the use of the document including dynamic font for the material for advertising and general publicity, or presentation. For example, sales promotion samples displayed on the personal computer provided at the shop is produced as the document including dynamic fonts, and are distributed to the shops in the form of a storage medium such as a floppy disk or a CD-ROM. The clerk in the shop installs the samples from the storage medium to the personal computer to display the advertisement including the dynamic fonts. Similarly, a material for use in a presentation may be produced with the dynamic fonts and displayed on the personal computer used in the presentation. Also in this case, the conversion program required to display the dynamic font is supplied together with the document data, and hence it is unnecessary that the personal computers have a dedicated conversion program in advance.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No.10-127233 filed on May 11, 1998 including the specification, claims, drawings and summary is incorporated herein by reference in its entirety.

What is claimed is:

1. A method of transmitting and receiving an electronic mail comprising the steps of:
   transmitting the electronic mail from a sender terminal to a receiver terminal, the transmitting step comprising the steps of producing the electronic mail including character codes of characters constituting a mail document, at least one conversion program for converting the characters to be displayed in an animated form, and an address of the receiver terminal, and transmitting the electronic mail; and
   receiving the electronic mail at the receiver terminal, the receiving step comprising:
   receiving the electronic mail;
   from a font storage unit storing character patterns corresponding to character codes, reading out the character patterns corresponding to the character codes included in the electronic mail;
   spreading the read-out character patterns on a bit map memory to produce bit map fonts;
   converting the bit map fonts by using the received conversion program according to the passage of time; and
   displaying the converted bit map fonts on a display device.

2. A method according to claim 1, wherein the conversion program comprises a coordinate c conversion program for converting coordinates of pixels constituting the bit map font according to the passage of time.

3. A method according to claim 1, wherein the conversion program comprises a filter program for performing filter operation processing of the bit map font.

4. An electronic mail transmitting method comprising the steps of:
   inputting character sequence constituting a mail document via an input device to produce character codes corresponding to the character sequence;
   designating a range of the character sequence and a type of animated character display applied to the range via the input device to produce data indicating the designated range and data indicating the type of the animated character display;
   designating an address of a receiver of the electronic mail via the input device;
   producing an electronic mail including the character codes, the data indicating the designated range, the data indicating the type of the animated character display and the address of the receiver; and
   transmitting the electronic mail to the address of the receiver.

5. A method of receiving an electronic mail including character codes of characters constituting an electronic mail and at least one conversion program for converting the characters to be displayed in an animated form, the method comprising the steps of:
   receiving the electronic mail;
   from a font storage unit storing character patterns corresponding to character codes, reading out the character patterns corresponding to the character codes included in the electronic; mail received;
   spreading the read-out character patterns on a bit map memory to produce bit map fonts;
   converting the bit map fonts by using the received conversion program according to the passage of time; and
   displaying the converted bit map fonts on a display device.

6. A computer-readable storage medium for storing a computer program to control a computer to execute the steps of:
   receiving inputs of character sequence constituting a mail document via an input device to produce character codes corresponding to the character sequence;
   receiving designation of a range of the character sequence and a type of animated character display applied to the range via the input device to produce data indicating the designated range and data indicating the type of the animated character display;

receiving designation of an address of a receiver of the electronic mail via the input device;

producing an electronic mail including the character codes, the data indicating the designated range, the data indicating the type of the animated character displays and the address of the receiver; and transmitting the electronic mail to the address of the receiver via a communication means.

7. A character display device comprising:

a unit for obtaining a document data including character codes corresponding to the characters constituting a document and at least one conversion program for displaying the characters in an animated form;

a bit map memory;

a unit for reading out the character patterns corresponding to the character codes included in the document data obtained and for spreading the character patterns on the bit map memory to produce bit map fonts;

a converter for converting the bit map fonts by the conversion program according to the passage of time; and a display for displaying the bit map font converted by the converter.

8. A computer-readable storage medium for storing a computer program to control a computer to execute the steps of:

obtaining a document data including character codes corresponding to the characters constituting a document and at least one conversion program for displaying the characters in an animated form;

reading out character patterns corresponding to the character codes included in the obtained document data from a font storage unit for storing character patterns corresponding to character codes and for spreading the character patterns on a bit map memory to produce bit map fonts;

converting the bit map fonts by the conversion program according to the passage of time; and displaying the bit map font converted by the converting step.

9. A document data producing device comprising:

a unit for receiving character sequence constituting a document via an input device and for producing character codes corresponding to the character sequence;

a unit for receiving designation of a range of the character sequence and a type of animated character display applied to the range via the input device to produce data indicating the designated range and data indicating the type of the animated character display; and a unit for producing document data including the character codes, the data indicating the designated range and a conversion program corresponding to the data indicating the type of the animated character display.

10. A device according to claim 9, further comprising a unit for storing the document data in a storage medium.

11. A document data supplying device comprising:

a unit for receiving character sequence constituting a document via an input device and for producing character codes corresponding to the character sequence;

a unit for receiving designation of a range of the character sequence and a type of animated character display applied to the range via the input device to produce data indicating the designated range and data indicating the type of the animated character display;

a unit for producing document data including the character codes, the data indicating the designated range and the data indicating the type of the animated character display;

a unit for producing a HTML (Hyper Text Markup Language) text including the document data produced by the document producing unit; and a unit for transmitting the HTML text to a receiver terminal via the internet.

12. A computer-readable storage medium for storing a computer program to control a computer to execute the steps of:

receiving inputs of character sequence constituting a document via an input device and producing character codes corresponding to the character sequence;

receiving designation of a range of the character sequence and a type of animated character display applied to the range via the input, device to produce data indicating the designated range and data indicating the type of the animated character display; and producing document data including the character codes, the data indicating the designated range and a conversion programs corresponding to the data indicating the type of the animated character display.

13. A computer-readable storage medium according to claim 12, wherein the program controls the computer to further execute the steps of:

reading out character patterns corresponding to the character codes of the characters included in the designated range from a font storage unit storing character patterns corresponding to character codes, and spreading the character patterns on a bit map memory to produce bit map fonts;

converting the bit map fonts by a conversion program according to the passage of time; and displaying the bit map fonts converted.

14. The method according to claim 1, wherein the conversion program changes the pre-determined characters of the electronic mail into an animated form.

15. The method according to claim 1, wherein the conversion program go changes the attribution of the characters according to the passage of time while the characters are displayed.

16. The method according to claim 1, wherein the conversion program changes the attribution of the characters to be displayed so that the characters appear to be moving.

17. The method according to claim 1, wherein the conversion program changes the pre-determined characters into several different forms, each form being displayed at a different time period.

* * * * *